United States Patent [19]

Hakimi et al.

[11] Patent Number: 4,680,767
[45] Date of Patent: Jul. 14, 1987

[54] OPTICAL FIBER LASER

[75] Inventors: Farhad Hakimi, Boston; Hong Po, Sherborn; Elias Snitzer, Wellesley, all of Mass.

[73] Assignee: Polaroid Corporation, Cambridge, Mass.

[21] Appl. No.: 750,594

[22] Filed: Jul. 1, 1985

[51] Int. Cl.$^4$ .............................................. H01S 3/30
[52] U.S. Cl. .......................................... 372/6; 372/12
[58] Field of Search .................. 372/6, 12, 13, 18, 20, 372/26, 28, 99

[56] References Cited

U.S. PATENT DOCUMENTS

| | | | |
|---|---|---|---|
| 3,599,106 | 8/1971 | Snitzer | 330/4.3 |
| 3,725,814 | 4/1973 | Schlossberg | 372/18 |
| 3,793,541 | 2/1974 | Ashkin et al. | 372/6 |
| 3,830,557 | 8/1974 | Hook et al. | 372/12 |
| 3,958,188 | 5/1976 | Fletcher et al. | 331/94.5 |
| 4,001,705 | 1/1977 | Sinclair et al. | 330/4.3 |
| 4,044,315 | 8/1977 | Snitzer | 331/94.5 |
| 4,358,851 | 11/1982 | Scifres et al. | 372/6 |

OTHER PUBLICATIONS

"Frequency Control of a Nd$^{3+}$ Glass Laser", Elias Snitzer, *Applied Optics*, vol. 5, No. 1, pp. 121-125, Jan., 1966.

Primary Examiner—Robert E. Wise
Attorney, Agent, or Firm—Francis J. Caufield

[57] ABSTRACT

An optical fiber laser comprising a gain cavity in the form of a single mode optical fiber with integrally formed reflective end sections for provision of feedback. One end section is an etalon for modifying the gain cavity resonant characteristics and intensity modulation, and the other end section is used to alter gain cavity effective length to tune and frequency modulate. The emission spectrum of the laser gain material, which is preferably neodymium oxide incorporated in a silicate glass core, along with the etalon section reflection, pump energy level, and gain cavity length cooperate so that lasing takes place over just a single line of narrow width or over more than one line within a narrow band. Electro-optic material in the end sections permit output frequency and amplitude to be selectively activated in response to the application of applied voltages.

14 Claims, 11 Drawing Figures

OPTICAL FIBER LASER

BACKGROUND OF THE INVENTION

This invention in general relates to optical radiation sources and in particular to improvements in lasers suitable for use in optical communication systems.

Communication by means of optical electro-magnetic radiation transmitted along optical fibers is now a well-established practice made possible by the development over the past 25 years of reliable, coherent sources, low-loss optical transmission fibers, and suitable detectors. Motivating this rapid progress was the proposal of the optical maser by A. L. Schawlow and C. H. Townes in 1958 and the subsequent announcement by T. H. Maiman in 1960 of its actual reduction to practice with laser action in ruby. With the achievement of the coherent, or quasi coherent, source came the recognition that the efficient transmission of radiation from laser sources along glass optical fibers of suitably low attenuation could provide communication systems which offered significant advantages over metallic cables, the most important of which was dramatically higher information carrying capacities. In addition, compactness and substantially reduced weight along with lower manufacturing and installation costs were also incentives adding impetus to this progress to the point where now systems operating near the theoretical shot noise limit for signal power at the detector and information capacity in a given wavelength interval are under consideration for installation in the field.

The higher information capacity of optical systems exists because a communication channel requires the same bandwidth regardless of the region of the spectrum in which it is located, and the higher-frequency regions, the optical regions, have far more room for channels and consequently have a much greater potential capacity than the lower competitive frequencies. To fully exploit this capacity in an economic way, however, places certain requirements on optical sources for use in such systems.

The basic characteristics for a light source for use in communications applications, and those which govern achievable system performance, include the source spectral emission such as wavelength, line width, and wavelength stability, power output, physical size, power efficiency, life, coherence, cost, and modulatability.

Source spectral emission must complement the optical fiber attenuation and dispersion properties if efficient use of source power is to be made. Attenuation characteristics of optical fiber waveguides varies as a function of wavelength, generally decreasing with increasing wavelength. Regions from 0.8 to 1.6 micrometers have attractive low-loss transmission. At the shorter wavelength end, loss is sufficiently low for many applications, but where maximum distance is to be covered between repeaters, the longer spectral region from 1.2 to 1.6 micrometers is more suitable.

Source spectral width is also an important consideration since the refractive index of fiber material also varies with wavelength. This latter property, known as material dispersion, causes pulse spreading which reduces the data rate capacity of the fiber, and the pulse spreading is more severe with spectrally wider sources than with narrower. Consequently, it is important that the spectral width of the source be as narrow as possible to be consistant with high data rate transmission. Inasmuch as the spectral emission characteristics of the source vary with temperature, it is important to keep in mind how these changes occur and to provide appropriate temperature control where necessary for the application in mind.

In wavelength division multiplexing applications, it is important that the width of the spectral emission of the source be as narrow as possible to achieve a high density of multiplexing. For wavelength multiplexing, the line width and its shape direcly influence adjacent channel cross-talk levels. A set of sources with a narrow emission spectrum of a few tenths of a nanometer, forming a set of non-overlapping spectral sources, can be used effectively to achieve wavelength multiplexing within a spectral range. If these sources have wider emission spectrum than the overlapping criterion would allow, selective filters can be used.

In general then, the source spectral output should be in a region where fiber attenuation is low and should be of narrow bandwidth to minimize dispersion effects and maximize both channel density and bandwidth, all while being very stable.

High signal power output is desirable because with higher power more attenuation can be tolerated before signal power level falls below a level for satisfactory detection. In addition, the power output distribution should be such that efficient coupling to the fiber is possible given its diameter and numerical aperture. At the other extreme, the power should not be so high as to exceed the material linearity limits unless for some special purpose that is intended.

The power efficiency of the source determines how much input power is required of the pump and, hence, also the heat dissipation requirements. Poor efficiency means higher input power requirements for given optical power output. This can present power supply problems for remotely located equipment. Inefficiently converted source energy also results in excessive heating, requiring appropriate heat dissipation arrangements otherwise unnecessary.

Reliability is of considerable importance, particularly where the optical source is to be used as one of a group in a system. Here both absolute life and mean time between failures (MTBF) are important parameters because they directly influence the reliability of the system overall. Absolute life for most applications is about 100,000 hours while for system applications a satisfactory MTBF is on the order of 10,000 hours or better.

Coherence is a property of sources which gives an indication of the ability of different parts of the wave train emanating from the source to interfere with one another and is of two types, spatial coherence and temporal coherence. The temporal coherence of a wave reflects the narrowness of the frequency spectrum and the degree of regularity of the wave train. Completely coherent light is equivalent to a single-frequency wave train with a frequency spectrum that can be expressed by only a single, monochromatic line. On the other hand, a wave with several frequency components, or a wave that consists of superimposed random short wave trains is said to be incoherent. In practice, it is extremely difficult to achieve a completely coherent wave. Since maximum bandwidth depends on spectral width, it is important for the source temporal coherence to be as good as possible consistent with the objectives of the system.

Cost is a comparative requirement, but it should not be so high that it overly burdens the overall system cost on a comparative basis with competitive systems and should take into consideration not only the cost of the basic device, but any equipment cost associated with the operation of the device itself.

Carrier waves provided by optical sources, like other carrier waves, have information imposed on them through the process of modulation. That is, some optical property of the carrier wave is modified in correspondence with a coding scheme, and the information is subsequently extracted from the carrier wave by suitable encoding techniques. If the output of the source has low temporal coherence, it is difficult to achieve phase and frequency modulation, but intensity modulation in analog and digital form is readily implemented and extensively used.

Modulation can be either internal, i.e., within a light generating source, or external. With an internal modulator, the output of the carrier source, such as a semiconductor laser, is made to vary in accordance with changes in the injection current, which typically serves as the electrical analog of the information signal. External modulators accept a source output as an input and then change some property of the source output for transmission along the fiber trunk line.

The rate of modulation is determined by the speed of the drive circuits and the response time constants of the source or external modulator as the case may be. The faster the response time, the wider the bandwidth signal to be handled.

Those skilled in the art have developed a variety of sources which satisfy the above requirements, some more perfectly than others depending on detailed differences, but all share in common fundamental ideas of operation.

For lasing optical sources, the conditions for laser oscillation in the visible and infrared regions of the spectrum are well understood. Fundamentally, these require that the laser material be capable of fluorescing and that an inversion in population take place between two different energy levels between which the fluorescent emission takes place. There is also the requirement that there be an adequate absorption of the pumping energy to permit pumping action by the light source. In addition, feedback is required through the resonant cavity containing the laserable material.

The ruby laser demonstrated by Maiman in 1960 was single-crystal aluminum oxide "doped" with chromimum impurities. During the intervening years, several crystalline or glass systems with impurity ions as, for example, glass doped with neodymium or other rare earth ions, have been developed.

A large number of gas lasers with outputs in the range from the far IR to the UV are known. Important among these are helium-neon, argon, and krypton as well as several molecular gas systems such as carbon dioxide and molecular nitrogen ($N_2$).

Solid state semiconductor lasers are known where the electron current flowing across a junction between P- and N-type material produces extra electrons in a conduction band. These radiate upon their making a transition back to the valence band or lower-energy states. If the junction current is large enough, there will be more electrons near the edge of the conduction band than there are at the edge of the valence band and a population inversion may occur.

Aside from the basic known material systems and structures, lasers in the form of optical fibers in which the lasing material has been incorporated into the core have been proposed as, for example, in U.S. Pat. No. 3,958,188 entitled "Fiber Distributed Feedback Laser" issued to James C. Fletcher et al on May 18, 1976 and as disclosed in U.S. Pat. No. 4,044,315 entitled "Means for Producing and Amplifying Optical Energy" issued to Elias Snitzer on Aug. 23, 1977.

In spite of the many innovations made in the laser art, improved laser structures are still required and can be usefully employed in optical fiber communication systems and in other systems, as well, for a variety of applications. Accordingly, it is a primary object of the present invention to provide an improved laser structure.

It is another object of the present invention to provide an improved laser structure capable of being modulated both in frequency and intensity.

It is yet another object of this invention to provide a stable laser having as an output a single narrow line or band of lines where each line in the band is itself narrow.

It is yet another object of the present invention to provide an improved laser structure having narrow output bandwidths at either 0.92, 1.06, 1.34, 1.54, or 2.0 micrometers more or less.

Other objects of the invention will, in part, be obvious and will, in part, appear hereinafter. The invention accordingly comprises the structure exemplified in the detailed disclosure which follows.

SUMMARY OF THE INVENTION

This invention generally relates to optical sources and specifically to improvements in lasers particularly suitable for use in optical communications systems requiring high channel density and data transmission rates.

The laser of the invention comprises an optical gain cavity in the form of a single mode optical fiber in which the laser gain material, preferably neodymium oxide, is present in the fiber core, which is preferably a host of silicate glass. Phosphate, germanate, and mixtures of these with silicate glasses are also suitable.

Integrally formed on each end of the optical fiber gain cavity are reflection sections which operate to provide feedback for lasing action.

One end section comprises an etalon, variable to intensity or frequency modulate the laser output and cause the output, in combination with the laser material gain curve, pump power level, and gain cavity length, to preferably lase at a single narrow line or group of adjacent narrowly separated resonant lines of the gain cavity which are themselves of narrow linewidth.

Either or both end sections can contain electro-optic, acousto-optic, or piezo electric devices to tune or frequency modulate the laser output. Associated with these end section devices are conductive layers to selectively change their characteristics in response to externally applied voltages.

When an RF signal of suitable frequency is applied to the etalon section so as to modulate the cavity losses, the laser becomes mode locked to provide a comb of stable frequency lines suitable for use as channel carriers and which furthermore have their phases so adjusted to give an output of well-defined pulses separated by the time it takes for light to travel down and back through the total length of the laser.

Pump power is preferably suppled by a laser diode and is preferably end coupled into the laser core via bulk optics.

BRIEF DESCRIPTION OF THE DRAWINGS

The novel features that are considered characteristic of the invention are set forth with particularity in the appended claims. The invention itself, however, including its organization, material structure, and method of operation, together with other objects and advantages thereof, will best be understood from the following detailed description when read in connection with the accompanying drawings wherein the same number has been used to denote a part wherever it appears in the figures and wherein:

DETAILED DESCRIPTION

The inventive optical fiber laser is one which is highly stable and tunable with the capability of providing an output of one or more lines of narrow width and narrow spacing, if of more than one line. It also has features by which it can be modulated in intensity, phase, and frequency, or combinations thereof, and which allow it to be mode locked, all attributes which make it extremely desirable for use in communications systems requiring high channel density and data transmission capacity.

Figure 1:
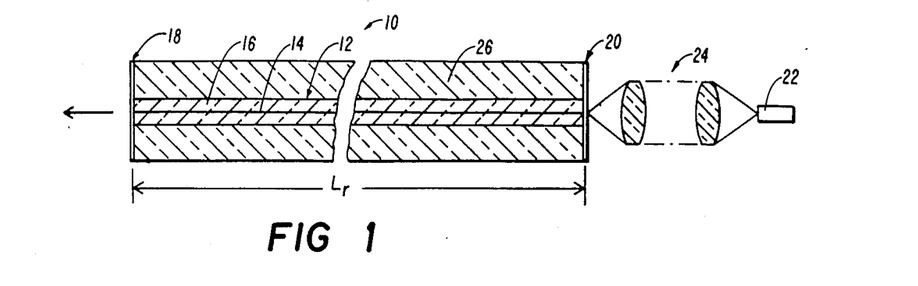
FIG. 1 is a diagrammatic elevation of the laser system of the invention.
Figure 2:
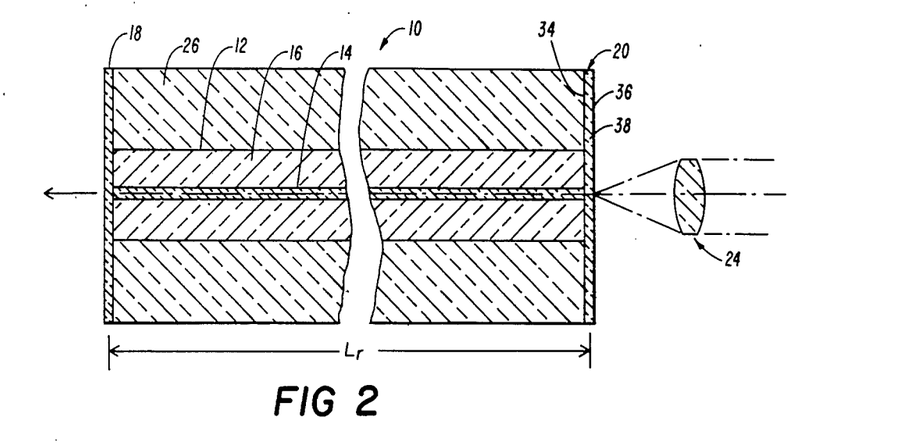
FIG. 2 is an enlarged diagrammatic elevation of parts of the laser system shown in FIG. 1.

The desirable characteristics of the inventive laser are achieved through the use of a combination of functional elements and a material system which may best be understood by now referring to FIG. 1 where the inventive laser is designated generally at 10.

The major components of laser 10 are a gain cavity in the form of a single mode optical fiber 12 which comprises a core 14 surrounded by a cladding 16. At the left end of optical fiber 12 is a variable etalon section 18, and at its right end a tuning and frequency modulation section 20, both of which can be integrally formed with the optical fiber 12. Both tuning and modulation could be at the same end. Energy from a pump source in the form of a laser diode 22 is preferably coupled into the end of the fiber core 14 through the tuning and frequency modulation section 20 by way of a bulk optical arrangement designated generally at 24. The pump source could also couple by a fiber optic element or be butt coupled.

The laser optical fiber cavity 12 is structured to propagate just single mode over the desired output line width or line to eliminate the effects of modal dispersion known to reduce data transmission rates. To make the fiber 12 suitable to propagate single mode, its geometry and material parameters are selected to satisfy the well-known relation:

$$2\pi a/\lambda (n_1^2 - n_2^2)^{\frac{1}{2}} < 2.405$$

where $a$ = core radius, $\lambda$ is the wavelength, $n_1$ and $n_2$ are the core and cladding indices of refraction, respectively, and 2.405 is a constant whose value is the $0^{th}$ order Bessel function at the first root. Since the wavelength region of most interest is in the near infrared where optical fiber transmission attenuation is smallest, the diameter of the core will be on the order of a few microns, more or less, while that of the cladding can be conveniently made larger and will be on the order of say, 80 to 100 micrometers, more or less. In addition, the core 14 and cladding 16 geometry can be non-circular and still be single mode propagating, but if it is of non-circular geometry, the previous equation is only approximately true and is to be applied accordingly.

Having assured that the core 14 propagates at only the wavelength or wavelengths of interest, it is provided with an effective length, $L_r$, at the opposite ends of which are the variable etalon section 18 and the tuning and frequency modulation section 20, both of which are structured to provide feedback to the gain cavity of laser 10 and to modify the resonant characteristics of the gain cavity compared to what they would otherwise be with just ordinary mirrors.

The output of laser 10 depends on the collective optical action attributable to its effective length, $L_r$, the reflectivity characteristics of the etalon section 18 and the tuning and frequency modulation section 20, the gain characteristics of the material of which the core 14 is made, and the pump energy level provided by the laser diode 22.

As in other resonant cavity structures, the effective length, $L_r$, determines the frequency or wavelength of the resonances supported in the cavity and is an integral number N of half-wavelengths, i.e., $$L_r = \frac{N\lambda}{2n_e}$$

where $\lambda$ is the free space wavelength and $n_e$ is the effective index of the core 14 at the resonant mode.

The wavelength separation between resonant modes of the cavity is determined by changing the value of N and then subtracting successive possible resonant wavelengths, assuming nearly equal values, to arrive at the following equation for expressing the separation between modes:

$$\Delta\lambda = \lambda^2/2L_r n_e$$

An inspection of this equation reveals that the shorter the resonant cavity, the greater the spacing between resonant modes or between channels transferrable.

The line spread of each of the resonant orders, assuming no internal losses and equal reflector values, is given by the following equation:

$$\Delta\lambda_s = \frac{(1-R)\lambda^2}{2\pi L_r n_e}$$

From this equation, it can be seen that the effect of increasing the resonant cavity length is to reduce the line spread of its resonant orders.

In practice, the length of the single mode optical fiber 12 is approximated so that its resonant cavity core 14 will resonate at modes which contain the single mode, or adjacent group of modes, desired, keeping in mind that the reflection characteristics of sections 18 and 20 have an effect on the true effective length and thus on which of these modes are possible, particularly section 18, as will subsequently be seen.

The overall length of the laser can vary by one or more orders of magnitude as desired. For example, a 10 centimeter long laser to produce an output of 1.058 micrometers having an effective index of refraction $n_e = 1.5$, and ends with reflectivities of about 95% will have a free spectral range of 0.04 angstroms and a line spread for low end reflector losses only of 0.0006 angstroms, while a 1 centimeter long laser with the same characteristics would produce a separation between resonant orders of 0.4 angstroms and would have a line width of 0.006 angstroms. Thus, lasers according to the invention can reasonably be expected to range in length from say a few meters down to one millimeter.

The variable etalon section 18 includes two spaced apart parallel filters, 28 and 30, which are separated by an electro-optical material 32 of nominal thickness, d. The electro-optic material 32 preferably is one which has a high electro-optic coefficient and is transparent to radiation at wavelengths desired as output from the laser 10. Although not shown, it is preferred to place a conductive coating around the electro-optic material 32 so that its optical characteristics may be easily changed in response to the application of an external voltage. This may be done in a well-known manner to, for example, change the nominal distance, d, to alter the optical path length over this region and thus obtain effects which will subsequently be described.

The filters, 28 and 30, are made dichroic so as not to transmit undesired wavelengths back to the fiber core 14 and, along with the electro-optic material 32, are arranged to be perpendiclar to the optical axis of fiber 12. With this configuration, the total reflectivity, R, at normal incidence, wavelength λ, thickness, d, and index of refraction n is given by:

$$R = \frac{(r_1^{\frac{1}{2}} - r_2^{\frac{1}{2}})^2 + 4(r_1 r_2)^{\frac{1}{2}} \sin^2\phi}{[1 - (r_1 r_2)^{\frac{1}{2}}]^2 + 4(r_1 r_2)^{\frac{1}{2}} \sin^2\phi}$$

where $\phi$ is equal to $2\pi n d/\lambda$ and $r_1$ and $r_2$ are the reflectivities of the two filters, 28 and 30, neglecting phase displacements at the surfaces due to coatings from which the filters, 28 and 30, are preferably formed.

With the reflectivities of the two filters, 28 and 30, taken equal to r, the above becomes:

$$R = 4r \sin^2\phi/[(1-r)^2 + 4r \sin^2\phi]$$

The reflection characteristics of the individual filters, 28 and 30, are preferably achieved using well-known interference filter coatings.

The tuning and frequency modulation section 20 includes two pairs of spaced apart parallel filters, 34 and 36, which are also arranged to be perpendicular to the optical axis of the optical fiber core 14, and these filters are also separated by a very thin electro-optical material 38, preferably with conductive coatings for selectively applying electric fields for reasons to follow. The filters, 34 and 36, are also dichroic and, in the direction of incoming energy, are highly transmissive to the pump energy wavelength but highly reflective with respect to the output operating wavelength of the laser 10 so as to provide the necessary feedback for laser action.

At the output operating wavelength for the laser 10, a satisfactory value for the joint reflectivity of the filters, 28 and 30, is 85% and individually 50% while 50% has been satisfactory for the filter 34, and for the filter 36, close to 100%.

To assist in fabricating both the laser end sections, 18 and 20, the optical fiber laser is placed inside of a glass capillary tube 26 and is potted there to remain fixed in place. The ends of this tube, along with the optical fiber 12 are ground and polished and the filter sections, 18 and 20, are then coupled to the polished ends in a well-known manner. In this way, the capillary tube 26 both aids in the fabrication of the end sections and provides a means for easily handling laser 10. For this purpose, the outside diameter of the capillary tube 26 is made to be several millimeters, or more, for convenience.

Now, as is well known, an atomic medium with an inverted population is capable of amplifying an electromagnetic wave if the latter's frequency falls within the transition line shape. If the laser medium is placed inside an optical resonator, the electromagnetic wave bounces back and forth between the two reflectors and picks up an additional amount of energy on each pass between them. If the amplification exceeds the losses caused by imperfect reflection in the mirrors and scattering within the laser medium, the energy stored in the resonator will increase with time. This causes the amplification constant to decrease as a result of the gain saturation. The oscillation level will keep increasing until the saturated gain per pass just equals the losses. At this point, the net gain per pass is unit and no further increase in the radiation intensity is possible.

Mathematically, for laser 10, this reduces to:

$$R_{18} R_{20} e^{(\alpha - \beta)L_r} = 1$$

where $R_{18}$ is the joint reflectivity of filters, 28 and 30; $R_{20}$ the joint reflectivity of filters, 34 and 36; $\alpha$ is the absorption coefficient of the laser core material; and $\beta$ the gain constant.

Figure 3:
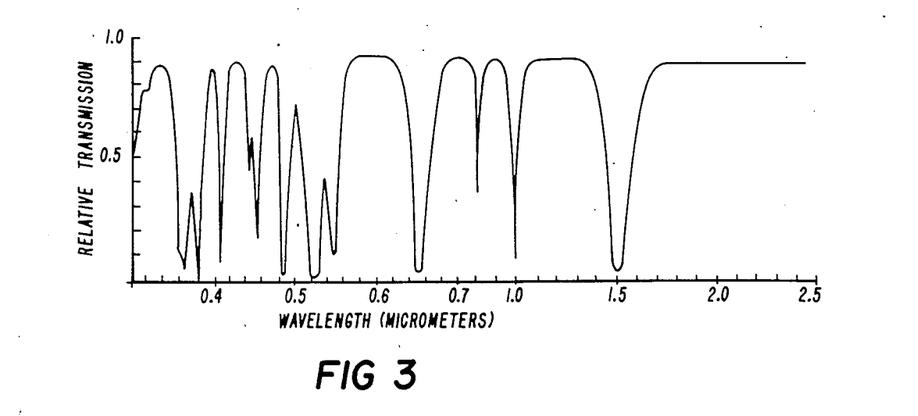
FIG. 3 is a graph illustrating the characteristic absorption spectrum of a given thickness of a material which may be employed in the laser of the invention.
Figure 4:
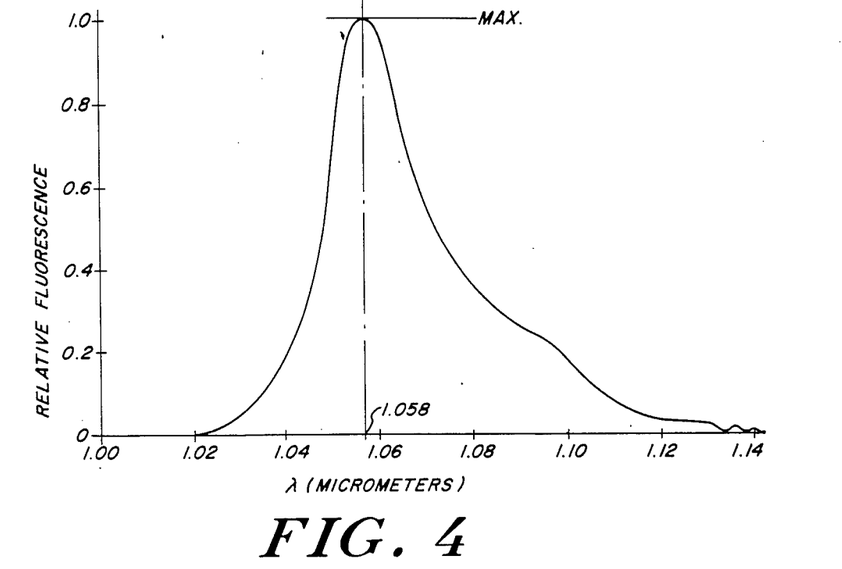
FIG. 4 is a graph illustrating the relative fluorescent spectrum as a function of wavelength for the same material to which the graph of FIG. 3 applies.

Although there are a number of material systems that may be used to achieve the necessary laser condition, it is preferable that the lasing medium be neodymium oxide incorporated into a silicate host glass serving as the base material for the fiber core 14. The cladding material is preferably a silicate, but can also be any other suitable material. A core material which has been found to be successful is one which is supplied by Schott Glass Technologies, Inc. and designated in their catalog with the identification, LG660 silicate. This is a silicate glass doped with 1½ by weight of neodymium oxide. The absorption spectra for this material is given in FIG. 3 while its relative fluorescence or emission spectrum is shown in FIG. 4, where it can be seen that there is a peak fluorescent output line at a wavelength of 1.058 micrometers. This is the preferred output wavelength for the laser 10 and, as will be seen, it is possible to achieve this frequency or a small bandwidth of frequencies surrounding it.

As will be appreciated by observing FIG. 4, it can be seen that the relative fluorescence spectrum of the core material is quite broad in bandwidth. This is characteristic of a gain material incorporated in a glass base or host material and is a consequence of the amorphous structure of the glass. It is referred to in the art as inhomogeneous broadening and results at least in part because each ion of the laser material does not experience exactly the same environment within the host material. Thus, even though the peak wavelength possible with this material system is highly desirable, it will be appreciated by those skilled in the art that the line width of the emission spectrum for this material is broader than that most desired for communications purposes and would benefit from some means of suppressing all possible resonant orders for the fiber cavity which could exist under this gain curve but which are not desired. As mentioned previously, this is accomplished by the cooperative action of the product of the reflection characteristics of the etalon end section 18 and the gain curve along with the pump energy level.

Laser diode 22 is preferably a well-known gallium aluminum arsenide type with a spectral output at approximately 0.8 micrometers and an emission line confined to a wavelength interval less than 300 angstroms. Its power level is regulated by controlling its injection current, and the bulk optics 24 are preferably chosen to carefully match the NA of the laser diode 22 to the NA of the optical fiber 12 which is approximately 0.3, for example. Thus, these components represent a means by which it is possible to controllably couple energy into the fiber core 12 to cause the population inversion above threshold to provide lasing action in the cavity and thus satisfies one requirement for controlling the laser frequency output. As will be appreciated by observing FIG. 3, the spectral line output of the laser diode 22 occurs at one of the peak absorption bands for the material in the region just above 0.8 micrometers.

Figure 5:
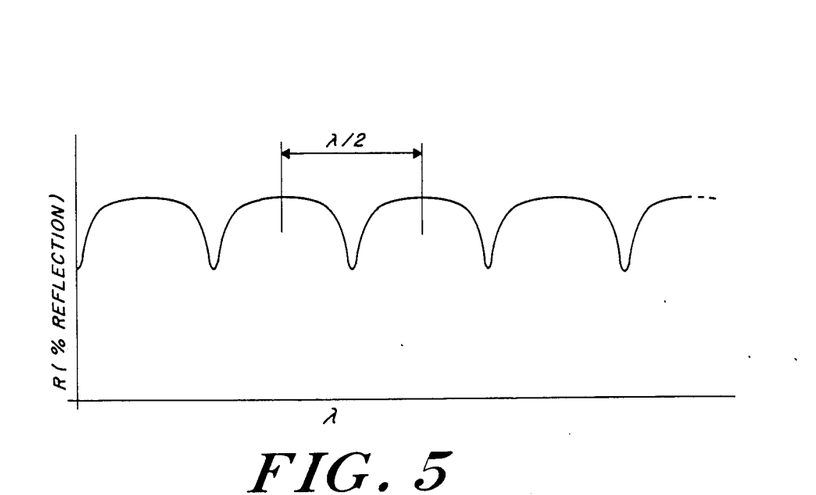
FIG. 5 is a graph showing in diagrammatic fashion the variation of reflectance with wavelength for a part of the laser system of the invention with that part fixed in one parameter.
Figure 10:
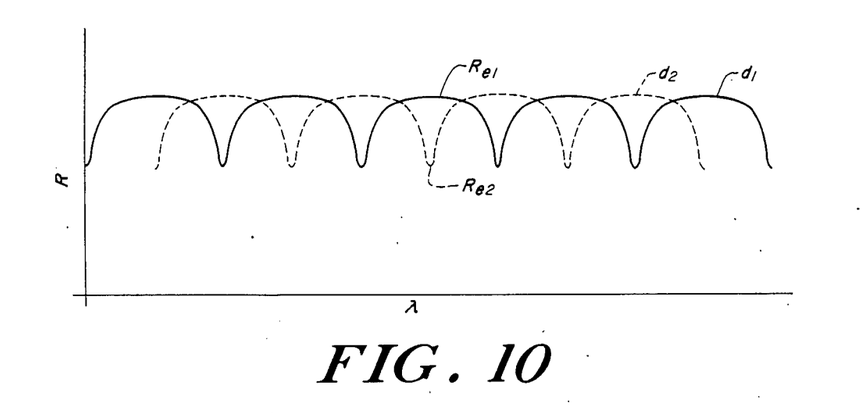
FIG. 10 is a graph showing how the reflection characteristics of part of the laser structure of FIG. 1 may be made to change as a function of variations in distance between the reflectors used in that structure.

The reflection characteristic of the etalon section 18 is shown in FIG. 5. As can be seen there, it is periodic in nature, repeating every integral number of wavelengths with maxima separated by one-half wavelength. The curve of FIG. 5 represents the reflection characteristic for a given nominal spacing, d. If the spacing, d, changes, then there is a shift in this reflection characteristic along the wavelength axis as shown in FIG. 10.

Figure 6:
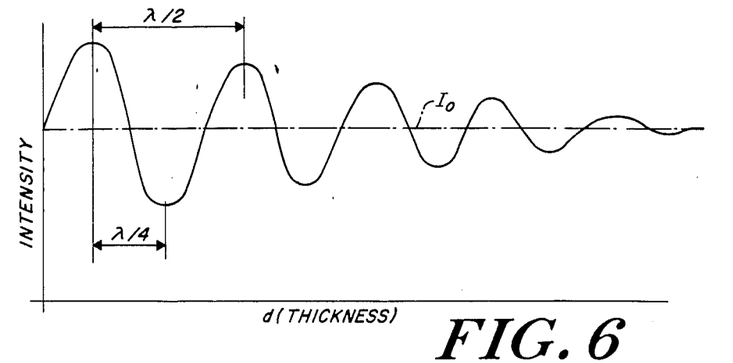
FIG. 6 is a graph illustrating how the output of the laser of the invention may be made to vary in amplitude as a function of displacements in part of its structure.
Figure 7:
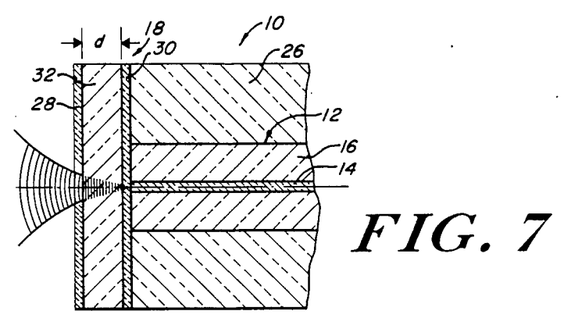
FIG. 7 is an enlarged diagrammatic elevation of part of the laser of FIG. 1 showing in diagrammatic fashion the change in shape of the wavefront emerging from the laser cavity as a function of distance from the end of the fiber laser core.

Reference is now made to FIG. 6 which shows how the output of the laser 10 may be made to vary by changing the thickness, d, of the end section 18. Here, the output intensity, which is for all wavelengths, is represented as some value $I_0$ which would be the output with only one mirror present in the end section 18. This output, $I_0$, then may be changed in the form of a decaying harmonic function as pictured in FIG. 6 with a maximum value occurring where the thickness, d, is ¼ wavelength away from no thickness. Thus, if one wishes to obtain maximum output, one of the things that can be done is to make sure that the thickness, d, exceeds ¼ wavelength. However, because the output of the fiber core is Gaussian, with an initial plane wavefront immergence pattern that turns into a spherical wavefront pattern downstream of the plane wavefront pattern, as shown in FIG. 7, it will be recognized that there is some outer limit on the thickness if efficient feedback is to be made from the section 18 back into the fiber core 14. Consequently, the thickness, d, should be chosen so that it is still within the field location where the wavefronts from the fiber core 14 are still planar, but not so close as to be closer than ¼ wavelength away from the outside surface of the reflector 30.

Figure 8:
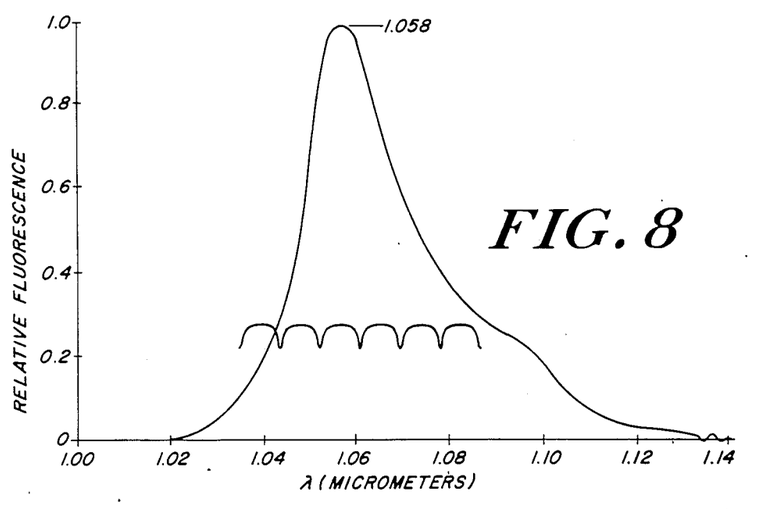
FIG. 8 is a graph showing again the relative fluorescence of one of the materials that can be used in the inventive laser with the reflection characteristics of part of the laser structure superimposed on it.
Figure 9:
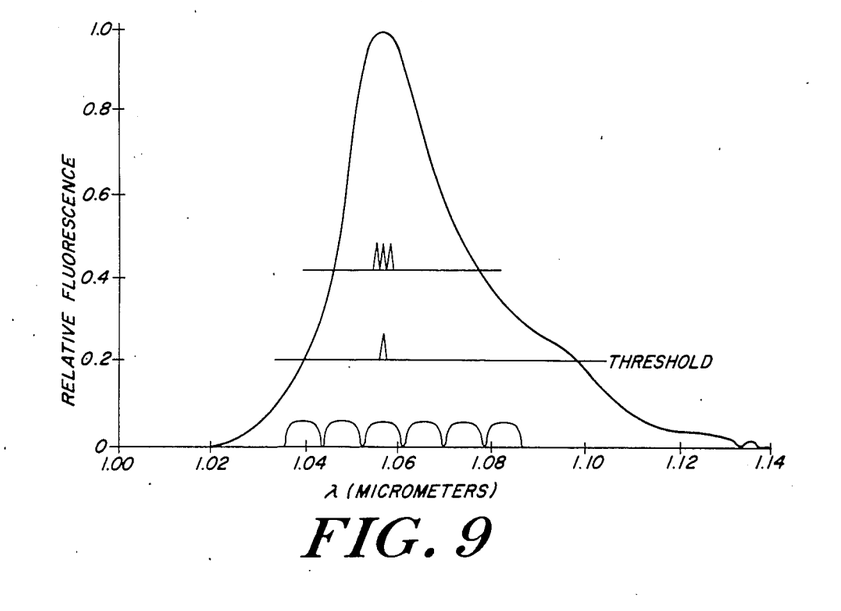
FIG. 9 is similar to FIG. 8 having imposed on it the same reflectance information that was superimposed on FIG. 8 along with possible line spectra from the laser of FIG. 1.

The reflection function of the etalon section 18 has in form an inverted Fabry Perot characteristic which is selected by a careful choice of the design parameters so that, at one of its maximum reflection points, it is aligned with the peak emission line for the fluorescence spectrum of the fiber core material as shown in FIG. 8. The separation between maxima, or if you like minimum reflection points, is chosen so that within this bandwidth there exists a number of resonant orders for the fiber core resonant cavity. It has been discovered that orders of the fiber core resonant cavity which are in side orders of the end section 18 resonant filter characteristics are completely suppressed, even when the pumping energy exceeds laser threshold. If the fiber resonant cavity is made shorter to increase the free spectral range between its resonant modes, it should be possible to even further reduce the number of orders which will resonate to the point where it is believed that a single order can be achieved. Of course, as the laser pump energy level is increased, more of the resonant orders of the fiber core will be excited and will thus be present, except that orders outside of the peak reflectance region centered on the peak spectral emission line will be excluded from lasing.

As an example, with this basic material system, it has been observed that, in a 10 centimeter optical fiber core cavity and an etalon section 18 with a thickness of about 60 microns, that it is possible to excite within a bandwidth of approximately 1 angstrom, separate lines with line widths less than 200 kilohertz. Repeated measurements have indicated that this output of adjacent lines is extremely stable and can be reduced in numbers by the simple expedient of reducing the overall length of the optical fiber cavity to the point where it is possible to, with looped fiber filters such as those described in U.S. patent application Ser. No. 625,543, entitled "Optical Resonant Cavity Filters" or with short, straight Fabry-Perot interferometers as herein described, isolate single resonant orders within that bandwidth. Alternatively, it should be possible to excite just one of the orders as mentioned previously by reducing cavity length.

By comparison with a resonant cavity 10 centimeters long but not having the etalon end section 18, it was observed that the output bandwidth was 100 angstroms wide. By the addition of the etalon, a reduction in bandwidth by two orders of magnitude occurred. Consequently, with this structure and material system, optical sources of high stability with extremely narrow bandwidths and separation between resonant orders have been provided.

Where it is required to intensity modulate the output of the laser 10, one may exploit the properties of the filtering characteristics of the section 18 shown in FIG.

6. Here it can be seen that one can go between maximum and minimum points by changing the thickness, d, by ¼ wavelength. Consequently, the excitation of the electro-optic material 32 can be used as a means for varying the thickness, d, over ¼ wavelength to intensity modulate the laser output.

By referring to FIG. 7, it can be seen that a change in the thickness, d, also results in a shift of the reflection characteristic curve of the etalon section 18 along the wavelength axis, and thus, there is a shift in the wavelength under the laser material gain curve at which the laser emits radiation. Consequently, one can also achieve wavelength shifts in the output of the laser 10 by activating the electro-optic material 32. This, however, not only shifts wavelengths, but as also explained, changes intensity. A small amount of modulation could give useful frequency modulation without significant intensity variations.

If it is required to simply change frequency or to tune the laser 10 for output at a particuar wavelength, use may be made of the end section 20. Here, activation of the electro-optical material 38 changes the overall effective length of the optical resonant cavity and thus can be used as the means for selecting the output wavelength in accordance with the basic equation governing optical resonant cavities (previously discussed). Thus, the end section 20 can be used as a means for either tuning the laser or as a means for frequency modulating its output without in any way disturbing its overall amplitude. To enhance these features, use may be made of electronic feedback arrangements to further achieve stability at particular wavelengths.

Figure 11:
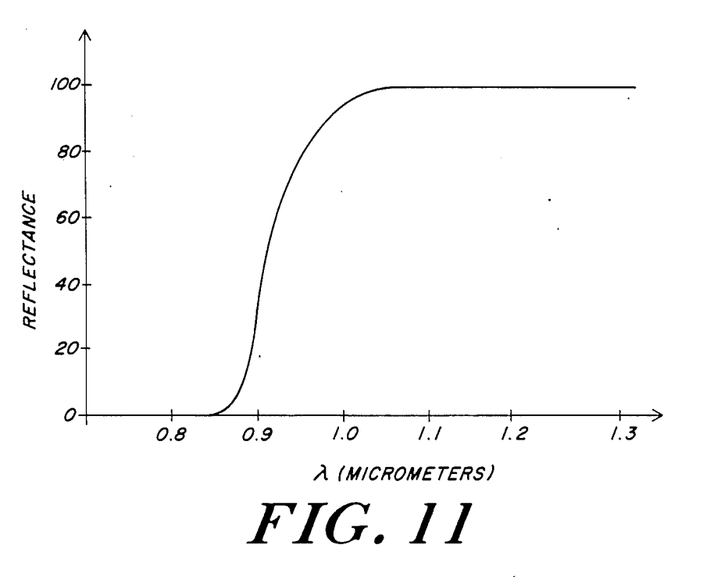
FIG. 11 is a graph illustrating the reflectance of a filter used in another part of the laser of FIG. 1.

As mentioned before, the reflectance characteristic for the filters 34 and 36 is shown in generalized form in FIG. 11 and for the particular example given had a high transmission with respect to energy coming from the laser pump system travelling towards the fiber core 14 and a high reflectance with respect to energy propagating in the core towards the end section 20. Preferably, the transmission of the filter 34 is 50%, while that of the filter 36 is as high as possible, approximating 100%.

When an RF signal at a frequency related to the round trip cavity time $t_o = 2L_r/n$, such that $f = 1/t_o$, is fed into the electro-optic material 32 so as to produce an effective modulation of the cavity loss, then the laser 10 becomes mode locked and can provide a comb of output lines at mode spacing apart for permitted modes. Operated in this way, laser 10 can supply a number of carrier signals closely spaced to achieve high channel density.

It will be recognized that the overall effective length of the optical fiber resonant cavity core was an approximation in the discussion above since it is affected by the effect of the end sections, 18 and 20. In practice, any differences between the mathematics and the actual performance is compensated for through careful experimentation to evaluate these additional effects.

What has been provided then is an optical source which lases over a very narrow bandwidth which for a given etalon encompasses more or less modes, depending on the effective length of the compound cavity and the pump energy level. With the pump energy level just above threshold and the effective compound cavity length short, it should be possible to resonate in just one mode or at most a few modes from which one can be extracted using known filtering techniques. Whether one wants just a single mode or more than one depends on the end use. In any event, the output in either case is highly stable and narrow band as a consequence of the basic material system and the integrated mechanical structure.

Those skilled in the art may practice the invention in other ways in accordance with its teachings and still be within its scope. For example, one could dope with erbium for a 1.54 micrometer output, holmium for a 2.0 micrometer, and ytterbium may also be used at 1.06 micrometer. Therefore, it is intended that all matter contained in the above description or shown in the accompanying drawings shall be interpreted as illustrative and not in a limiting sence.

What is claimed is:

1. An optical fiber laser comprising:
   a gain cavity including a single mode optical fiber of given length having a core with a given index of refraction and a cladding surrounding said core and having an index of refraction lower than that of said core, said core comprising a host glass having incorporated therein a laser gain material with a fluorescence spectrum having at least one broadband region in which there is at least one peak emission line;
   filter means optically coupled to one end of said gain cavity and reflective to radiation emitted from said gain material over a predetermined wavelength interval about said peak emission line to provide feedback in said gain cavity;
   an etalon filter section butt coupled to the remaining end of said gain cavity optical fiber, said etalon filter section comprising a pair of filters spaced apart in parallel by a predetermined length of material transparent to any radiation emitted from by said gain cavity, one of said parallel filters being in direct physical contact with said core and perpendicular to the longitudinal axis of said core with the other of said parallel filters serving as the emitting end of said laser, said predetermined length of said transparent material in combination with the reflection characteristics of said pair of parallel filters being such that etalon filter section operates as a Fabry-Perot resonator in reflection with a periodic reflectivity characteristic having a peak reflectivity centered at said peak emission line of said gain material and gradually dropping to no reflectivity on either side of said peak reflectivity, said etalon filter section and the resonant characteristics of said gain cavity being structured and arranged with respect to one another to jointly operate to enhance laser action at said peak emission line and to preclude it beyond a wavelength interval centered about said peak emission line, said predetermined length of said transparent material being such that said etalon filter section is no longer than the distance over which the wave train energy from said fiber core remains substantially planar so that said etalon filter section is inside the divergent region from said fiber core to enhance feedback in said gain cavity; and
   means for pumping energy into said gain cavity to raise the interval energy level of said gain material such that only a small part of the ion population thereof, corresponding to a predetermined bandwidth about said peak emission line, is raised above laser threshold for said gain material so that said laser emits radiation only over narrow lines over a narrow wavelength interval centered about said peak emission line.

2. The laser of claim 1 wherein said given length of said optical fiber and said etalon are selected so that said laser has only one emission line.

3. The laser of claim 1 wherein said given length of said optical fiber is in the range including 1 millimeter to at least one meter.

4. The laser of claim 1 wherein the ratio of said given length of said optical fiber to said predetermined length of said etalon section material is in the range including 100,000 to 1,000 to 1.

5. The laser of claim 1 wherein said laser gain material is selected from the group comprising neodymium, erbium, holmium, and ytterbium and compounds thereof.

6. The laser of claim 5 wherein host material comprises a silicate glass.

7. The laser of claim 1 wherein said cladding is selected from the group comprising silicate and germinate glass and combinations thereof.

8. The laser of claim 1 wherein said energy pumping means comprises a laser diode.

9. The laser of claim 1 wherein said material between said filters of said etalon section comprises an electro-optic material responsive to an externally applied voltage to alter the characteristics of said etalon section.

10. The laser of claim 9 wherein the optical path length of said etalon section is altered.

11. The laser of claim 9 wherein said etalon section is responsive to an externally applied voltage to vary the amplitude of the output of said laser.

12. The laser of claim 11 wherein said etalon section is responsive to an externally applied voltage to vary the frequency of the output of said laser.

13. The laser of claim 1 wherein the length of said etalon section is greater than one quarter of the shortest output wavelength of said laser.

14. The laser of claim 1 wherein said filter means at said one end of said gain cavity is variable to change the frequency output of said laser and to tune said laser.

* * * * *